United States Patent
Nichols

[15] 3,695,346
[45] Oct. 3, 1972

[54] TABLE AND/OR TABLE CONVEYOR STRUCTURE

[72] Inventor: William A. Nichols, c/o W. A. Nichols Co., 819 West 25th St., Kansas City, Mo. 64108

[22] Filed: Aug. 11, 1970

[21] Appl. No.: 62,942

[52] U.S. Cl. ....................165/120, 62/63, 62/374, 62/380, 198/202, 198/208
[51] Int. Cl. ............................................F28g 5/00
[58] Field of Search ......198/208, 204, 202; 165/120, 165/56, 136, 120; 62/177, 380, 63, 374, 458

[56] References Cited

UNITED STATES PATENTS

| | | | |
|---|---|---|---|
| 2,844,359 | 7/1958 | Annerhed | 62/380 X |
| 2,974,497 | 3/1961 | Carpenter et al. | 62/380 X |
| 2,812,924 | 11/1957 | Hupman | 165/120 X |
| 3,538,719 | 11/1970 | Pradel | 165/136 X |
| 3,456,776 | 7/1969 | Viene | 198/208 |

FOREIGN PATENTS OR APPLICATIONS

| | | | |
|---|---|---|---|
| 1,426,944 | | Germany | 62/458 |
| 1,237,002 | 3/1967 | Germany | 198/202 |

*Primary Examiner*—Frederick L. Matteson
*Assistant Examiner*—Theophil W. Streule
*Attorney*—Fishburn, Gold & Litman

[57] ABSTRACT

A processing table particularly for food products wherein the table is a hollow shell of non-corrosive material with all of the wells connected to provide a substantially continuous surface with no openings or joints or crevices that can collect material. The elongate table structure is supported on spaced pedestals connected to the bottom, and there is a rigid synthetic foam substantially filling the shell to form a compression resisting structure. A conveyor belt operates over pulleys mounted at the ends of the table structure with one run movable longitudinally of the table top and the other run under the shell. One of the pulleys is supported in bearings and at one end of the table structure and driven from a motor and speed reducer, the other pulley being at the other end of the table and supported in bearings mounted on arms swingably mounted relative to the table whereby said pulley may be moved from a belt slack position to a belt tightened position, said swingable arms having adjustments for adjusting the tension of the belt. Key means is arranged relative to the table and swingable arms to hold the arms in belt tightened position. The table has lateral portions providing work surfaces at each side of the top run of the belt and said table has refrigeration coils under the table top for cooling the top and thereby retarding growth of bacteria. A belt washing apparatus is arranged at one of the pedestals for cleaning the belt with provisions at said pedestal for disposal of the wash liquid.

7 Claims, 7 Drawing Figures

PATENTED OCT 3 1972 3,695,346

INVENTOR.
William A. Nichols
BY
Fishburn, Gold and Litman
ATTORNEYS

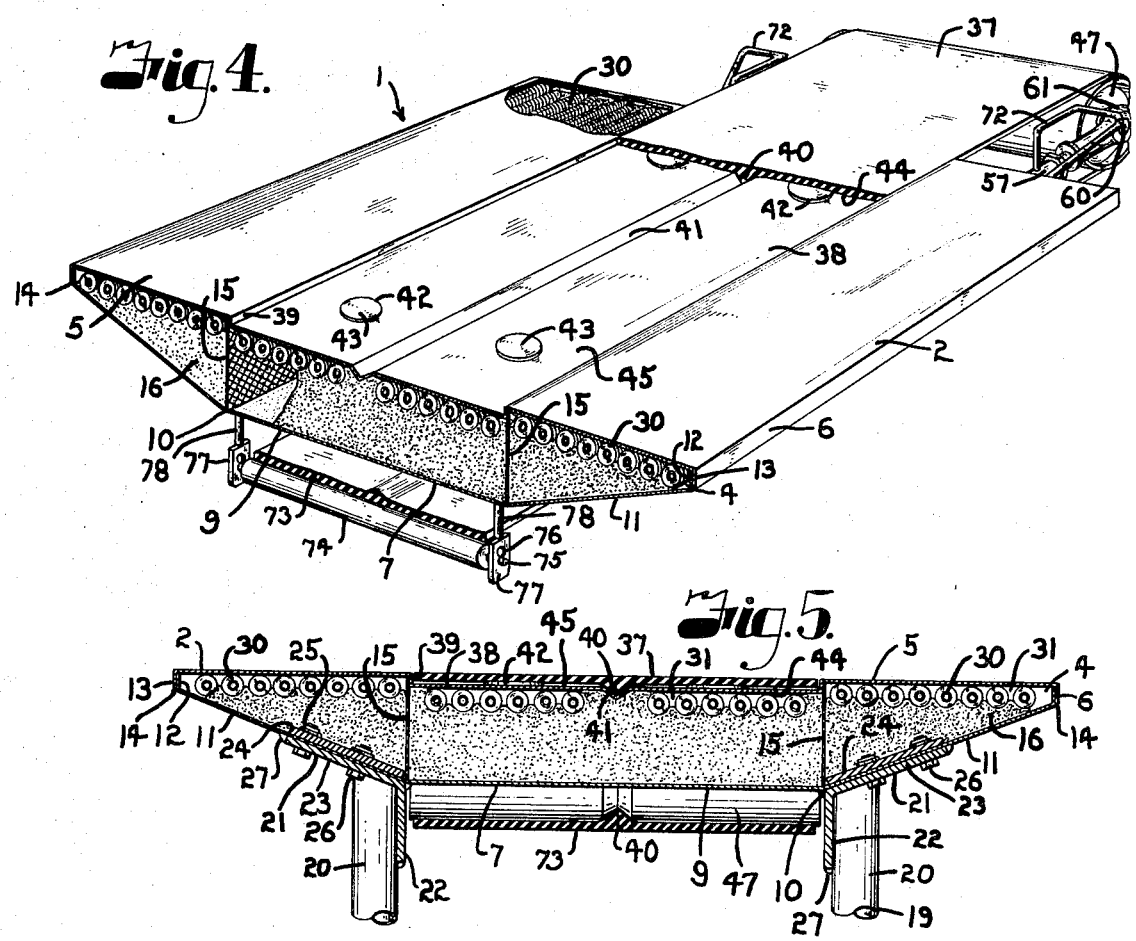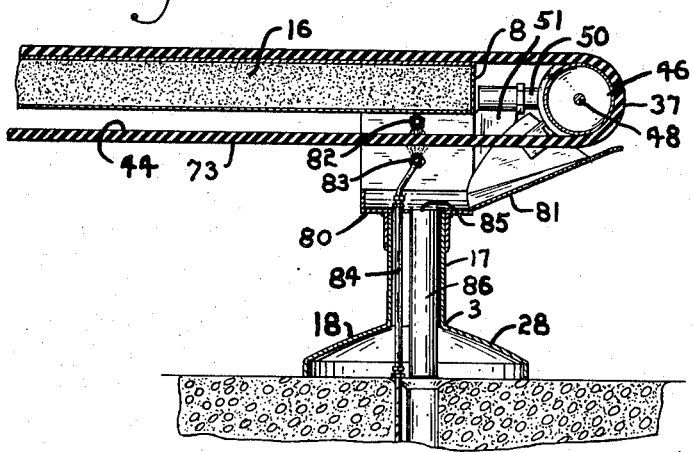

TABLE AND/OR TABLE CONVEYOR STRUCTURE

BACKGROUND OF THE INVENTION

Processing tables heretofore used for processing food products, such as meat and the like, are usually relatively long and have various structural members joined together by bolts, welding or the like to provide a strong structure. Such framing, even though of stainless steel or the like, presents flanges or other surfaces underneath and also corners or crevices, all of which can collect material such as contaminants, bacteria, and the like. Such corners, crevices, and surfaces are difficult to clean, and in some instances where there is a joint, or the like, with two layers of material substantially in contact, contaminating liquids containing bacteria can enter between the surfaces and be substantially impossible to remove in normal cleaning operations.

The invention described herein involves a table structure, which, with or without a conveyor, involves a substantial improvement over the structures heretofore used in that the table forms a truss-like member of great strength that is characterized by the absence of corners, crevices, or hard-to-reach surfaces, so that the entire structure is easily and quickly cleaned to provide a more sanitary condition and bacterial growth is retarded so that it is more economical to maintain proper conditions to supply the consumer with uncontaminated products.

The principal objects of the present invention are: to provide a processing table structure in the form of a hollow shell presenting a substantially continuous exterior surface characterized by an absence of inaccessible material collecting corners, crevices, and surfaces; to provide such a structure wherein the shell is of non-corrosive material such as stainless steel and is substantially filled with rigid synthetic foam forming a compression resisting structure whereby the table is a truss like member requiring a minimum of supports; to provide such a structure with refrigeration for chilling top surfaces; to provide such a table structure with a conveyor belt longitudinally encompassing said table; to provide a conveyor belt with an upper run in a longitudinal recess or depressed portion of the table and a lower run under the table, said conveyor belt operating over pulleys mounted at the ends of the table with one pulley driven and the other pulley selectively swingable to loosen the belt to facilitate cleaning thereunder; to provide such a structure when the arms carrying the swingable pulley are selectively locked in operating position with the belt tensioned and said arms have adjustable portions to provide selected tension on the belt; to provide such a structure wherein the belt is cleaned as it passes near one pedestal with connections for disposal of wash liquid and material removed from the belt; and to provide a processing table and conveyor structure that is easy and economical to maintain in a sanitary condition and that is of great strength relative to the weight and thereby able to support substantial loads.

Other objects and advantages will become apparent from the following description taken in connection with the accompanying drawings wherein are set forth by way of illustration and example certain embodiments of this invention.

FIG. 4 is an enlarged partial prospective view of the table and conveyor structure with portions broken away to illustrate the interior structure.

FIG. 5 is a transverse sectional view through the table and conveyor belt structure taken on the line 5—5, FIG. 2.

FIG. 6 is a partial longitudinal sectional view through an end portion of the table and conveyor structure taken on the line 6—6, FIG. 1.

Figure 1:
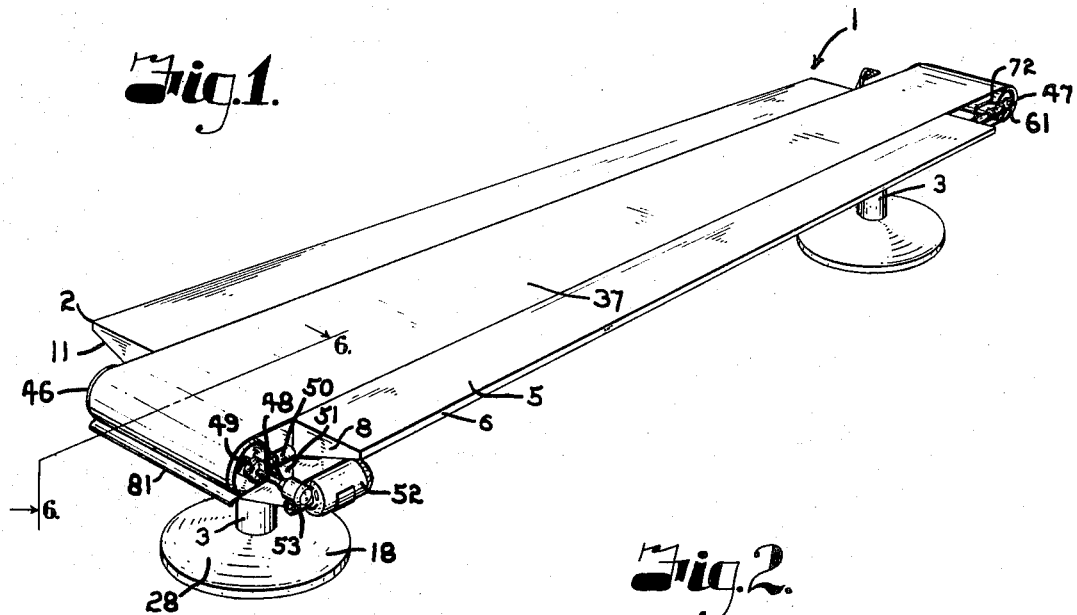
FIG. 1 is a perspective view of a processing table and conveyor structure embodying the features of the present invention.

Referring more in detail to the drawings:

The reference numeral 1 generally designates a processing table particularly adapted for sanitary handling of food products. The basic unit consists of an elongate table top member 2 supported by spaced support members or pedestals 3. The table top member is formed of non-corrosive material such as stainless steel sheet arranged in a hollow shell 4 having a top wall 5, side walls 6, bottom wall 7, and end walls 8, all connected together to provide a unitary structure of desired width and length. In the structure illustrated, the bottom wall 7 has a substantially flat horizontal central portion 9 terminating at sides, as at 10, in upwardly inclined side portions 11, which have upturned flanges 12 at side edges. The top wall extends across the width of the table and has downturned side flanges 13, which engage over the flanges 12, and are substantially co-extensive in height therewith. The bottom edge of the flanges 13 are welded to the flanges 12, as at 14, in a continuous weld that is dressed off to provide a rounded surface having no crevices. The end walls are welded to the ends of the top wall 5, bottom wall 7, and flanges 12 and 13 in continuous welds that are also dressed and rounded so that all of the exterior surfaces of the shell 4 are smooth. The structure may be of any suitable size, as for example, four feet in width and in lengths up to forty feet, and with a minimum of supports for simplicity and ease of sanitary maintenance.

The table top is of a structure that provides great strength and is generally in the nature of a truss. To add to the strength and rigidity, the shell is provided with struts 15 on the interior thereof between the bottom and top walls. In the structure illustrated, the struts are perforated, metal members that extend for the full length of the shell and are connected to the bottom and top walls as by welding. The table structure could have one or more struts, and in the structure illustrated, there are two extending upwardly from adjacent the sides of the central section 9 of the bottom wall.

The interior of the table shell 4 is substantially filled with a compression material 16 in the form of a rigid synthetic resin foam. Any suitable resin foam may be utilized, as for example, polyethylene or polyurethane. One example is a polyurethane applied with an expander such as freon. The foam preferably having a density of 2 to 5 pounds. The foam is applied to the interior of the shell after it is completed by having holes in an end wall through which foam dispensing tubes are inserted and moved substantially the length of the shell, then as the foam is extruded from the tubes to fill the interior, the tubes are gradually withdrawn according to the rate of discharge of the foam so that the interior is substantially filled when the tubes are completely withdrawn. The openings are then closed, as by welding, and the welds dressed off to provide a smooth surface. As the table top shell is fabricated, the interior surfaces are cleaned and it is found that the resin foam bonds tightly to the metal surfaces.

The supports for the table are in the form of pedestals also made of non-corrosive material, such as stainless steel. They include column portions 17 extending upwardly from a respective enlarged base members 18 with arms 19 secured to the upper portion of the columns and extending outwardly and upwardly in a generally U-shape form with the upstanding portions 20 having angle bracket members 21 fixed to the upper ends thereof. The bracket members 21 each have a vertical leg 22 and an upwardly and outwardly inclined leg 22 adapted to engage and be secured to the bottom wall portions 11 of the table top member. To provide strength at the points of support, the shell 4 is provided with pads in the form of plates 24 welded to the interior surfaces of the wall portions 11, said pads having thickened portions as by closed end nuts 25 welded thereto, with aligned holes in the plate 24, wall 11, and leg 23, so that the table can be secured to the supports by cap screws 26 threaded into said nuts. A caulking or seal material 27 is applied around the entire periphery of the joint between the bracket member and bottom wall so as to seal same and prevent entry of any material therebetween. For strength with lightness in weight, the base 18 is a hollow structure with a domed upper surface as at 28, and the column is a tube, which, for the table alone, will have a closed upper end. The arms 19 also are preferably tubular so that each of the supports provide rounded surfaces that are also easily cleaned.

With a table constructed as described, there is a minimum of supports, each of which is easily cleaned; there is an absence of obstructions so that the floor around the supports and under the table also can be easily cleaned. The top member formed by the shell is a strong, truss-like member in which the foam supports the walls so there is substantially no deflection even at loads far in excess for those normally handled on such tables. Also, the exterior surface of the table is such there are no crevices or joints to collect material or bacteria and all the outer surfaces are easily washed so the structure is easily maintained in a sanitary condition.

In handling meats and the like it is desired to have cool surfaces, and as a further aid to sanitation it is preferred to maintain the top wall 5 of the table in a refrigerated condition, as for example, it is found that a temperature of approximately 34° F. will prevent growth of bacteria. In the structure illustrated, elongate refrigeration coils 30 are placed inside the shell 4 substantially in contact with the interior of the top wall 5. In the structure illustrated, the refrigeration tubes 30 are finned tubes which extend substantially the length of the table, said tubes being closely spaced and held in contact with said wall 5. With the refrigeration tubes in place, the application of the foam to the table interior will cause the foam to contact the fins of the refrigeration tubes, but the foam will not pass through small spaces, therefore, while the foam supports the refrigeration tubes, which in turn support the table top wall 5, there is a space 31 around the tubes adjacent the top wall 5 and the foam 16 forms an insulation under the space so the cooling is directed to the top wall 5. The refrigerant can be pumped through the tubes in any suitable manner from a refrigeration system.

The basic unit 1 may be combined with one or more basic units arranged in end-to-end relation. It is preferred that the tables when so arranged have the adjacent ends supported on a pedestal structure 33 to hold the tables against relative movement with ends spaced, as at 34. The space 34 is preferably covered by thin stainless steel plate 35 having secured thereto a resilient plug member 36 with said plate and plug member being co-extensive with the table width. The plug member 36 is preferably of a thickness whereby it is compressed as it is forced into the space 34 to substantially close the space between the tables when the plate 35 is resting on the upper surface of the top wall 5 of the tables. The plug and plate members are removable whereby they can be cleaned and the ends of the tables cleaned to maintain a sanitary condition.

In a process table wherein products are conveyed therealong by means of a conveyor belt 37, the top wall 5 of the table member has a central portion 38 that is depressed or at a level below side portions of said wall. In the structure illustrated, the depressed table portion 38 extends for the length of the table and has side edge portions connected by substantially vertical wall portions 39 with the inner edge of the side table portions. In the illustrated structure, the depressed portion of the top is substantially the same width as the central bottom portion 9 with the upper portion of the struts 15 connected to the respective wall portion 39. The space between the wall portions 39 is slightly greater in width than the width of the belt 37 whereby the belt will operate therebetween with suitable clearance.

The belt 37 may be of any suitable type adapted to handle foods and the like, and that is adapted to be subjected to frequent cleaning. The belt of rubber or synthetic rubber having a substantially non-porous surface is preferred. In the structure illustrated, the belt has a generally V-shaped rib 40 on its under surface substantially midway between the side edges thereof. The depressed portion 38 of the table has a substantially corresponding V-shaped recess 41 extending longitudinally of the table for the full length thereof to receive the rib 40 and form a guide therefor. To reduce friction or resistance to movement of the belt along the table, the depressed portion 38 has a plurality of spaced raised rounded protrusions 42 having flat top surfaces 43 adapted to be engaged by the underside 44 of the conveyor belt and thereby support said belt slightly raised from the surface 45 of the depressed wall member 38.

The conveyor belt 37 operates over a head pulley 46 and a tail pulley 47 mounted at opposed ends of the table. In the structure illustrated, the head pulley 46 is fixed to a shaft 48 rotatably mounted in bearings 49 arranged at the ends of bearing supports 50 mounted on extensions 51 of the bracket legs 22. The head pulley 46 provides a driving force for the belt and the power supply is shown as an electric motor 52 operatively connected through a speed reducer 53 to the shaft 48. The tail pulley 47 is spaced from the adjacent end 55 of the table top 2 and is carried on a mounting that permits pivoting or swinging of the pulley bodily about an axis located between the pulley and said end 55 of the table top 2 to obtain slack in the belt permitting it to be lifted from the table for facilitating cleaning. In the structure illustrated, the bracket legs 22 each has an extension 56 extending beyond the end 55 of the table, there being an extension on each side. A sleeve member 57 is provided with a depending flange 58 pivotally supported by a pin 59 on the respective extension 56. The tail pulley 47 has a shaft 60 rotatably mounted in bearings 61 of the seal type, said bearings each being supported by an arm 62 having a threaded shank 63 slidable in the respective sleeve 57. A nut 64 is threaded on each of the shanks 63 and abuts the end 65 of the sleeve 57 whereby threading of the nuts on the sleeves changes the amount of threaded shank in the sleeves and thereby changes the spacing of the axis of the shaft 60 therefrom, so as to provide an adjustment for the tension on the belt.

Figure 2:
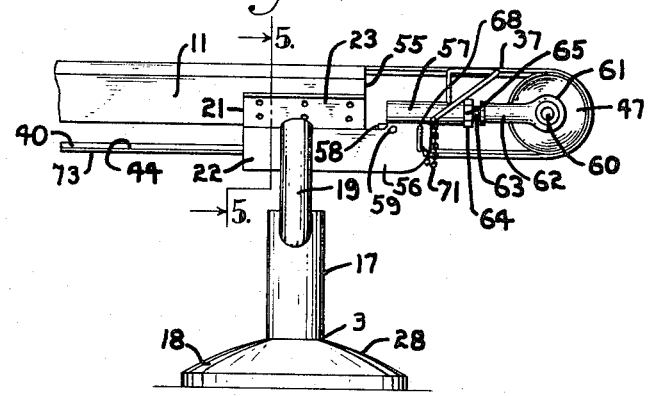
FIG. 2 is a side elevation of an end of the table conveyor structure with the pivotal tail pulley assembly in belt tensioned position.

The flanges 58 and extensions 56 have keyhole openings 66 and 67, respectively, that are aligned when the tail pulley 47 is moved to operative position, as shown in FIG. 2. The keyhole slots have the elongate portion downwardly and a key or lock member 68 having a lug 69 thereon is adapted to extend through the keyhole openings 66 and 67 to position the lug 69 inwardly of the flange 58. The key member 68 has a handle portion 70 extending in opposed direction from the lug so when the key is in the holes 66 and 67 the handle will swing downwardly moving the lug out of alignment with the elongate portion of the openings and retain said lug in such position so that the key cannot be accidentally removed. There is a key and lock structure for each bearing mounting of the pulley 47 to assure positive positioning. The key members 68 are shown as connected by flexible members such as chains 71 to the respective sleeve 57.

Figure 3:
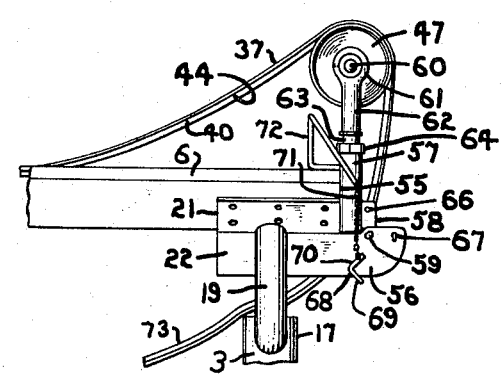
FIG. 3 is a partial side elevational view of an end portion of the table conveyor structure with the tail pulley swung to belt loosening position.
Figure 7:
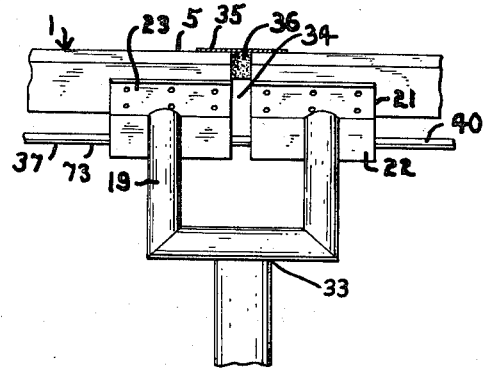
FIG. 7 is a side elevational view of a connection between table sections for a long processing line with a single conveyor belt thereon.

When it is desired to clean the table under the belt, the keys 68 are removed and the arm and sleeve assemblies swung upwardly to the position shown in FIG. 3 wherein a stop member 72 on each of the sleeves 57 engages the table top. When in this position, there is substantial slack produced in the conveyor belt 37 and in such slack condition the belt can be lifted away from the wall 39 for cleaning under the belt and also the underside of the belt. When such maintenance is completed, the arms and sleeves are swung downwardly to operative position as shown in FIG. 2 and the keys 68 inserted in the openings 66 and 67.

The upper run of the belt moves over the depressed wall portion 38, the lower run 73 extends under the table between the bracket legs 22. Suitable support is provided under the table for the lower run, and in the illustrated structure, belt supporting idler rollers 74 have shafts 75 mounted in openings 76 in laterally spaced holders 77 carried on shanks 78 fixed to and depending from the bottom wall 7 of the table.

The support or pedestal at the end of the table adjacent the head pulley has a sump member 80 thereon provided with an extension 81 extending outwardly under the pulley 46 whereby any loose material on the belt will tend to fall on said extension and slide downwardly to the sump. Also, the belt is preferably washed by sprays directed thereon from tubular spray pipes 82 and 83, respectively, arranged above and below the lower run 73 of the belt 37 over the sump 80. A wash liquid supply duct 84 extends upwardly through the hollow column to supply liquid to the spray members. The sump 80 has an opening 85 whereby material in the sump can drain therefrom to a pipe 86 leading to a sewer or other disposal. Electrical conduits and the like can also be arranged inside said supports so as to have a minimum of lines exposed, thereby making it easier to maintain the premises in sanitary condition.

It is to be understood that while I have illustrated and described certain forms of my invention, it is not to be limited to these specific forms or arrangements of parts herein described and shown.

What I claim and desire to secure by Letters Patent is:

1. A processing table comprising:
   a. an elongate hollow shell having a top wall, side walls, a bottom wall, and end walls connected at adjacent edges to form a closed elongate structure with the top wall having portions forming work surfaces conveying means on said top wall adapted for movement therealong;
   b. spaced supports having connection with said bottom wall to support said shell,
   c. a rigid synthetic resin foam substantially filling said shell and bonded to inner surfaces thereof to form a compression resisting structure therein supporting the top wall against deflection, and
   d. heat transfer means operably adjacent the underside of said top wall and at least partially within said foam.

2. The table as set forth in claim 1, wherein said heat transfer means comprises:
   a. a plurality of refrigeration tubes inside the shell and adapted for circulating refrigerant and cooling the top wall of the table,
   b. said rigid synthetic foam being in contact with said refrigeration tubes and forming a heat insulation whereby the cooling effected by the circulating refrigerant is concentrated on the top wall above said tubes.

3. A processing table comprising:
   a. an elongate hollow shell having a top wall, side walls, a bottom wall, and end walls connected at adjacent edges to form a closed elongate unitary wall structure with the top wall having portions forming work surfaces;
   b. spaced supports having connection with said bottom wall to support said shell;
   c. a rigid synthetic resin foam substantially filling said shell and bonded to inner surfaces thereof to form a compression resisting structure therein supporting the top wall against deflection;
   d. a depressed portion in the table top extending longitudinally thereof for the length of said table, and
   e. a continuous conveyor belt longitudinally encompassing said table and movably supported with one run movable over said depressed portion of the table.

4. A processing table comprising:
a. an elongate hollow shell having a top wall, side walls, a bottom wall and end walls connected at adjacent edges to form a closed elongate unitary wall structure with the top wall having portions forming work surfaces;
b. spaced supports having connection with said bottom wall to support said shell,
c. a rigid synthetic resin foam substantially filling said shell and bonded to inner surfaces thereof to form a compression resisting structure therein supporting the top wall against deflection,
d. a continuous conveyor belt longitudinally encompassing said table and movably supported with one run movable over said top wall, and
e. said top wall being wider than the conveyor belt providing work surfaces extending laterally outwardly therefrom.

5. The table as set forth in claim 2, including:
a. a plurality of raised protrusions on said top wall with flat top surfaces supporting said one run of the conveyor belt.

6. The table as set forth in claim 2, including:
a. at least one perforated brace member extending longitudinally of the shell within same and secured to the top wall and bottom wall for substantially the length thereof forming a strut member to maintain relative spacing thereof;
b. said synthetic resin foam having supporting contact with said perforated brace member.

7. A processing table as set forth in claim 2, wherein:
a. the supports are hollow pedestals with each having an enlarged base and upstanding column thereon terminating in laterally extending arms, and
b. mounting brackets on said arms and secured in supporting relation to the table bottom wall.

* * * * *